United States Patent
Barth et al.

(10) Patent No.: US 6,294,233 B1
(45) Date of Patent: Sep. 25, 2001

(54) EDGE-SEALED WINDOW FILMS AND METHODS

(75) Inventors: Steven A. Barth; Steven L. Debusk, both of Martinsville, VA (US)

(73) Assignee: C P Films, Inc., Martinsville, VA (US)

( * ) Notice: Subject to any disclaimer, the term of this patent is extended or adjusted under 35 U.S.C. 154(b) by 0 days.

(21) Appl. No.: 09/274,911

(22) Filed: Mar. 23, 1999

(51) Int. Cl.[7] .................................................. B32B 17/10
(52) U.S. Cl. ........................... 428/34; 428/14; 428/192; 428/346; 428/430; 428/432; 428/458
(58) Field of Search ........................ 428/14, 34, 192, 428/343, 346, 350, 426, 430, 432, 457, 458, 480

(56) References Cited

U.S. PATENT DOCUMENTS

| | | | |
|---|---|---|---|
| 4,046,951 | 9/1977 | Stefanik | 428/412 |
| 4,050,892 | 9/1977 | Jilla | 8/4 |
| 4,055,971 | 11/1977 | Hermes | 68/9 |
| 4,408,021 | 10/1983 | Penn | 525/440 |
| 4,429,005 | 1/1984 | Penn | 428/350 |
| 4,557,980 | 12/1985 | Hodnett, III | 428/336 |
| 4,565,719 | 1/1986 | Phillips et al. | 428/34 |
| 4,634,637 | 1/1987 | Oliver et al. | 428/622 |
| 4,640,868 | 2/1987 | Penn | 428/446 |
| 4,797,317 | 1/1989 | Oliver et al. | 428/209 |
| 4,960,631 | 10/1990 | Walters et al. | 428/192 |
| 5,122,403 | 6/1992 | Roginski et al. | 428/38 |
| 5,320,893 | 6/1994 | Floyd | 428/136 |
| 5,340,661 | 8/1994 | Van Havenbergh et al. | 428/690 |
| 5,725,937 | 3/1998 | Johnston | 428/209 |
| 5,778,629 | * 7/1998 | Howes | 52/786.11 |

* cited by examiner

Primary Examiner—Blaine Copenheaver
Assistant Examiner—Alicia Chevalier
(74) Attorney, Agent, or Firm—Nixon & Vanderhye P.C.

(57) ABSTRACT

Transparent edge sealed window films substantially minimize (if not eliminate entirely) degradative effects on the window film, particularly solar-reflecting metals and/or oxides associated with multilayer window films, caused by ambient conditions (e.g., commercial window cleaners, salt and the like). The edges of window films are preferably sealed by a liquid solvated polymeric material which, upon curing, provides a solid transparent seal which significantly minimizes the degradative effects of the ambient environment. Most preferably, the window film whose edges are sealed will include a transparent thermoplastic (e.g., a polyester) film layer and a solar-reflecting metal and/or oxide applied onto a surface of the film layer. The sealant for such a preferred window film will be a polyester-type sealant which has silane end-group functionality and substantially no free isocyanate groups.

4 Claims, 1 Drawing Sheet

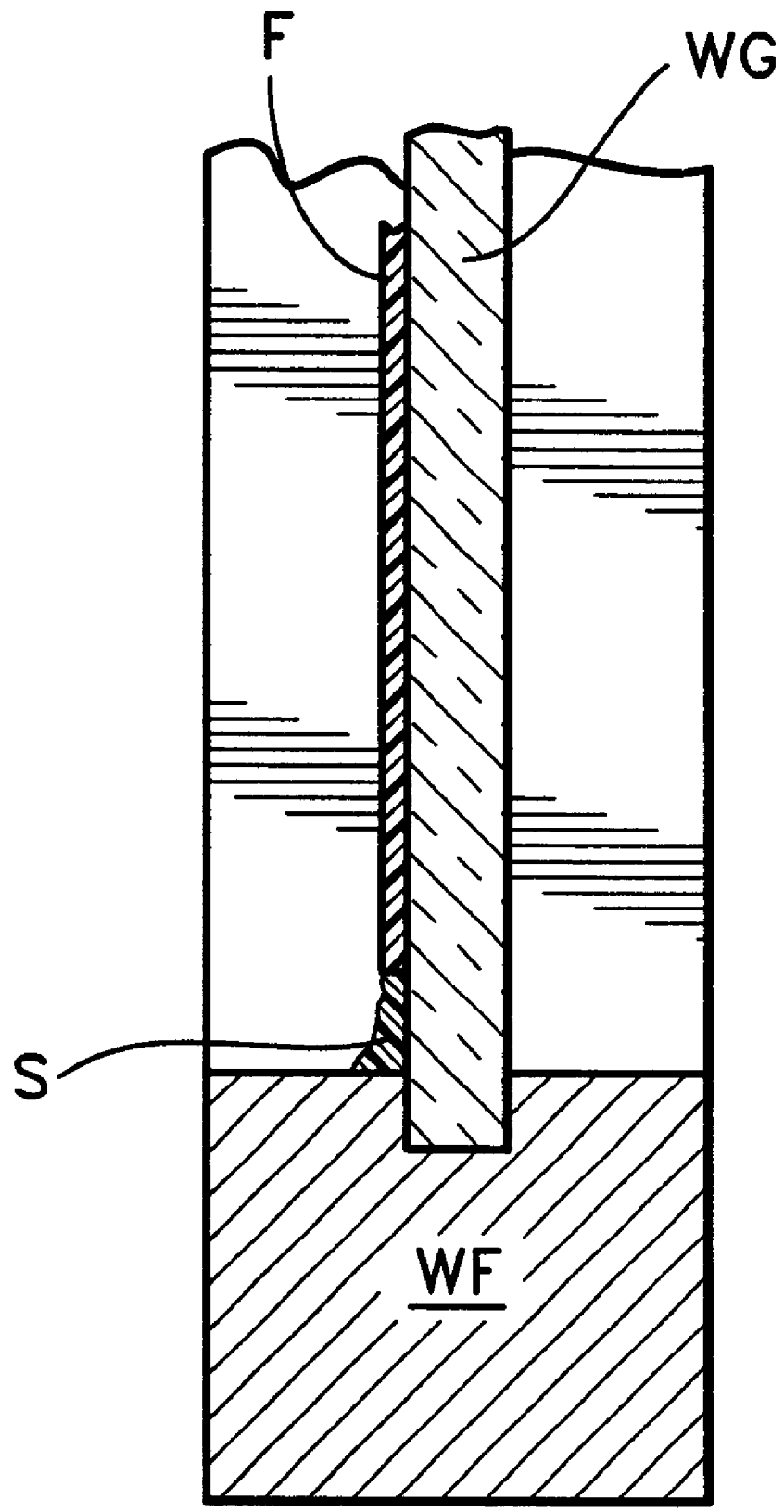

EDGE-SEALED WINDOW FILMS AND METHODS

FIELD OF THE INVENTION

The present invention relates generally to the edge-sealing of window film materials. More specifically, the present invention relates to edge-sealing of window films which provide enhanced protection to multilayer films, particularly those films having solar-reflecting metals or oxides which are prone to corrosion from ambient materials (e.g., window cleaners, natural salt and the like).

BACKGROUND AND SUMMARY OF THE INVENTION

Transparent window films are adhered to glass window surfaces so as to reduce the amount of near infra-red, ultra-violet and/or visible radiation entering interior building space. Films are also provided so as to maintain heat in the interior space—that is, to reduce heat radiation loss through the window. The window films thus assist to minimize loads on the heating, ventilating and air conditioning (HVAC) system which services the building. Lower HVAC loads thereby translate into lower costs of heating or cooling the interior building space.

Such "solar films" can have a variety of film structures. For example, one common type of solar film is a laminate structure having a base layer (e.g., a transparent polyester sheet, such as polyethylene terephthalate sheet) having a relatively thin, transparent solar reflective metallized deposit thereon. A protective layer (e.g., polyethylene terephthalate) may then be applied over the solar reflective layer. See, for example, U.S. Pat. No. 4,634,637, the entire content of which is expressly incorporated hereinto by reference.

Solar films are typically adhered physically to a surface of a glass window using a suitable transparent adhesive, such as those disclosed in U.S. Pat. Nos. 4,429,005 and 4,408,021, the entire content of each patent being incorporated expressly hereinto by reference. In general, the window films are cut to substantially cover the entire window glass area, except for a small border region between the edges of the film and the window frame (typically on the order of between about 1/16 inch to about 1/8 inch). In order to protect the solar film from the degradative effects of window cleaners and other ambient atmospheric conditions (e.g., moisture and salt), it may be necessary to seal the edges of the window film with a suitable sealant. In this way, the sealant substantially minimizes (and most preferably prevents) degradative chemical attack on the individual layers of the solar film so that it retains its appearance over its useful life.

Broadly, therefore, the present invention is directed to transparent edge sealed window films which substantially minimize (if not eliminate entirely) degradative effects on the window film, particularly solar-reflecting metals and/or oxides associated with multilayer window films, caused by ambient conditions (e.g., commercial window cleaners, salt and the like).

In particular embodiments, the edges of window films are sealed by a liquid solvated polymeric material which, upon curing, provides a solid transparent seal which significantly minimize the degradative effects of the ambient environment. Most preferably, the window film whose edges are sealed will include a transparent thermoplastic (e.g., a polyester) film layer and a solar-reflecting metal and/or oxide applied onto a surface of the film layer. The sealant for such a preferred window film will most preferably be a polyester-type sealant which has silane end-group functionality and substantially no free isocyanate groups. The silane end groups of the preferred sealant chemically attach to both the glass substrate on which the window film is adhered in addition to the oxides in the film at the cut edges. Furthermore, the polyester resin in the sealant will bond with the thermoplastic forming the film layer. As a result, an impermeable edge seal is formed which withstands attacks on the film components by conventional window cleaning chemicals as well as significantly minimizing, if not preventing entirely, corrosion of the metallized deposit on the film layer (e.g., when subjected to ASTM B-117 Salt-Fog Exposure).

Further aspects and advantages of this invention will become more clear after careful consideration is given to the following detailed description of the preferred exemplary embodiments thereof.

BRIEF DESCRIPTION OF THE ACCOMPANYING DRAWINGS

The accompanying drawing FIGURE is a cross-sectional schematic view of an edge-sealed window film according to the present invention.

DETAILED DESCRIPTION OF THE INVENTION

The liquid sealant employed in the practice of this invention must be chemically compatible with the window glass, window frame structures and the particular window film whose edge is being sealed and must accomplish its intended window film edge-sealing functions when dried or cured. In this regard, the following criteria may be employed by those in this art when selecting a particular liquid sealant: (i) reduced corrosion of metallized film when subjected to ASTM B-117 Salt-Fog Exposure, (ii) non-corrosive/non-damaging to common window frame materials (e.g., wood, vinyl and aluminum), (iii) UV-resistant, (iv) resistant to ammonia and acetic acid to allow cleaning window with common household window cleaners containing ammonia or acetic acid without disturbing and/or destroying edge sealant, (v) excellent adhesion to glass, polyester, acrylic scratch resistant coatings used on conventional window films, uncoated and coated (e.g., polyurethane, shellac, oil or water-based paint coatings) wood, and uncoated and coated (e.g., oil or water-based paint coatings) aluminum, (vi) non-tacky after drying to prevent dust and dirt accumulation, (vii) drying within minutes, (viii) relatively clear after drying to minimize appearance of edge sealant, and (ix) non-clouding when exposed to high humidity.

Preferred edge sealants are those which include solvated polymeric materials. Thus, the sealant is solvated to an extent to provide the necessary flow properties for transfer and application to the window and film surface in a sufficient thickness to allow for edge-sealing without substantial running and/or dripping. When applied to the edge of the window film, the liquid sealant should have a viscosity for such purpose of between about 20 to 30 seconds, and most preferably between about 23 to about 24 seconds, measured using a Gardner #2 Zahn cup at standard temperature (20° C.). The viscosity of the particular sealant material may thus be readily adjusted to within acceptable ranges by the addition of a suitable solvent.

One particularly preferred sealant material is a solvated polyester (i.e., a polyester dissolved in a suitable liquid organic solvent). Specifically, this preferred sealant is the reaction product of a silane containing a free isocyanate (NCO) group (e.g., gamma-isocyanatropropyltriethoxy silane), and a thermoplastic polyester. The thermoplastic polyester is most preferably formed by reacting (i) a dibasic acid selected from the group consisting of terephthalic acid, isophthalic acid, and hexahydrophthalic acid, and mixtures thereof, with (ii) a polymethylene glycol of the formula $HO(CH_2)_xOH$ where x is an integer from 2 to 10, neopentyl glycol and glycerin, and mixtures thereof, and (iii) an aliphatic dibasic acid selected from the group consisting of those having the formula $HOOC(CH_2)_nCOOH$ where n is an integer from 1 to 8, and mixtures of such acids. The preferred sealant will have silane end group functionality and substantially no free isocyanate (NCO) groups.

The preferred edge sealant material is more fully described in U.S. Pat. Nos. 4,429,005 and 4,408,021, the entire content of each being expressly incorporated hereinto by reference. These preferred edge sealant materials are available commercially from Morton International, Inc. of Chicago, Ill. under the tradename Adcote™. Particularly preferred are Adcote™ 89R1 or 89R3 materials conventionally used as adhesives for adhering window films to glass substrates. According to the present invention, the commercially obtained sealant material contains, by weight, approximately 47% 2-butanone/methyl ethyl ketone (MEK), 20% toluene, with the balance being a polyester resin. This commercially supplied material is then reformulated by the addition of solvents to achieve a solution comprised of, by approximate weight percentage, 60% MEK, 9% toluene, 12% propylene glycol mono-methyl ether acetate (1-methoxy-2-propanol, acetate) with the balance being the polyester resin. The reformulated edge sealant will therefore exhibit a viscosity within the range noted previously.

In use, as is more clearly shown in the accompanying FIGURE, the liquid sealant material is applied onto the edge of the window film F so that it covers the window film edge and adheres to the underlying widow glass WG substrate and the adjacent window frame WF and thereby form the sealing layer S therealong. The sealant material is allowed to dry once the sealant layer S has been applied to all edge areas surrounding the window film F. The sealant layer S thus seals the edge of the window film F so as to prevent degradation by chemical cleaning agents, environmental salt and the like.

Any suitable window film F may be employed in the practice of the present invention. Thus, the window film may have one or more metallized layers on a thermoplastic substrate, for example, as described in U.S. Pat. Nos. 4,634,637, 4,557,980 and 4,797,317 (the entire content of each being expressly incorporated hereinto by reference). Alternatively, or additionally, the window film may be a film dyed in accordance with U.S. Pat. Nos. 4,050,892 and 4,055,971 (the entire content of each being expressly incorporated hereinto by reference).

Thus, while the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A window comprising:

a window frame;

window glass mounted in said window frame;

a solar film adhered to the window glass and having an edge which is spaced from said window frame so as to establish a boundary region of exposed window glass therebetween; and an edge sealant applied over said edge of said solar film and at least a portion of said boundary region of said exposed glass substrate, wherein said window film includes a polyester film layer and at least one metal or metal oxide solar coating on said polyester film layer; and wherein said edge sealant is a cured transparent residue of the reaction product of a thermoplastic resin and a silane containing a free isocyanate group, said edge sealant being chemically bonded to said polyester film layer, said at least one metal or metal oxide solar coating on said polyester film layer and said portion of said boundary region of said exposed glass substrate, and being bonded to an adjacent portion of said window frame so as to form a seal between said edge of said solar film and window frame which thereby resists ambient degradative effects on said metal or metal oxide solar coating.

2. The window of claim 1, wherein said silane is gamma-isocyanatropropyltriethoxy silane.

3. The window of claim 1, wherein the edge sealant is the reaction product of (i) a dibasic acid selected from the group consisting of terephthalic acid, isophthalic acid, and hexahydrophthalic acid, and mixtures thereof, with (ii) a polymethylene glycol of the formula $HO(CH_2)_xOH$, where x is an integer from 2 to 10, neopentyl glycol and glycerine, and mixtures thereof, and (iii) an aliphatic dibasic acid selected from the group consisting of those having the formula $HOOC(CH_2)_nCOOH$ where n is an integer from 1 to 8, and mixtures of such acids.

4. The edge-sealed window film of claim 1 or 3, having silane end group functionality and substantially no free NCO groups.

* * * * *

UNITED STATES PATENT AND TRADEMARK OFFICE
CERTIFICATE OF CORRECTION

PATENT NO. : 6,294,233 B1
DATED : September 25, 2001
INVENTOR(S) : Barth et al.

It is certified that error appears in the above-identified patent and that said Letters Patent is hereby corrected as shown below:

<u>Title page,</u>
Item [75], Inventors, change "Steven L. Debusk" to -- Steven L. DeBusk --;

Item [73], Assignee, change "C P Films, Inc." to -- CPFilms, Inc. --

Signed and Sealed this

Thirtieth Day of April, 2002

Attest:

JAMES E. ROGAN
Attesting Officer     *Director of the United States Patent and Trademark Office*